United States Patent
Sakoda et al.

(10) Patent No.: US 7,369,870 B2
(45) Date of Patent: May 6, 2008

(54) RADIO COMMUNICATION SYSTEM, MOBILE RADIO COMMUNICATION APPARATUS AND METHOD THEREFOR, FIXED RADIO COMMUNICATION APPARATUS AND METHOD THEREFOR, RECORDING MEDIUM, AND PROGRAM

(75) Inventors: Kazuyuki Sakoda, Tokyo (JP); Tomoya Yamaura, Tokyo (JP)

(73) Assignee: Sony Corporation, Tokyo (JP)

( * ) Notice: Subject to any disclaimer, the term of this patent is extended or adjusted under 35 U.S.C. 154(b) by 353 days.

(21) Appl. No.: 10/395,226

(22) Filed: Mar. 25, 2003

(65) Prior Publication Data
US 2003/0199275 A1    Oct. 23, 2003

(30) Foreign Application Priority Data
Mar. 28, 2002    (JP) .............................. 2002-091363

(51) Int. Cl.
*H04Q 7/20*    (2006.01)
(52) U.S. Cl. ....................................... 455/522; 455/446
(58) Field of Classification Search .................. 455/69, 455/522, 63, 436, 574, 513, 13.4, 439, 442, 455/33.2, 432.1, 432, 127.5; 370/331
See application file for complete search history.

(56) References Cited
U.S. PATENT DOCUMENTS
6,044,067 A    3/2000    Suzuki 6,421,370 B1    7/2002    Yasaki
6,792,248 B1*    9/2004    Naghian ....................... 455/69
2002/0193133 A1*    12/2002    Shibutani ..................... 455/522

FOREIGN PATENT DOCUMENTS

| EP | 1 071 223 A2 | 1/2001 |
|---|---|---|
| JP | 10-65604 | 3/1998 |
| JP | 11-155172 | 6/1999 |
| JP | 2000-91985 | 3/2000 |
| JP | 2001-309425 | 11/2001 |

* cited by examiner

*Primary Examiner*—Tu Nguyen
(74) *Attorney, Agent, or Firm*—Oblon, Spivak, McClelland, Maier & Neustadt, P.C.

(57) ABSTRACT

Efficient radio communication is implemented in a usage pattern desired by users. A cellular phone as mobile radio communication apparatus communicates by air with a base station as fixed radio communication apparatus (Step S1). When the cellular phone detects that the cellular phone is positioned at the fringe of the cell of the base station (Step S3), the cellular phone independently makes adjustment to lower the transmission power according to the judgment of the cellular phone itself in correspondence with the received power from the base station (Step S11). Further, the cellular phone lowers the bit rate of transmission data in correspondence with the adjusted transmission power (Step S12). The present invention is applicable to information processors, such as cellular phones, PDAs, and mobile terminals, provided with a radio communication function.

20 Claims, 11 Drawing Sheets

F I G. 1
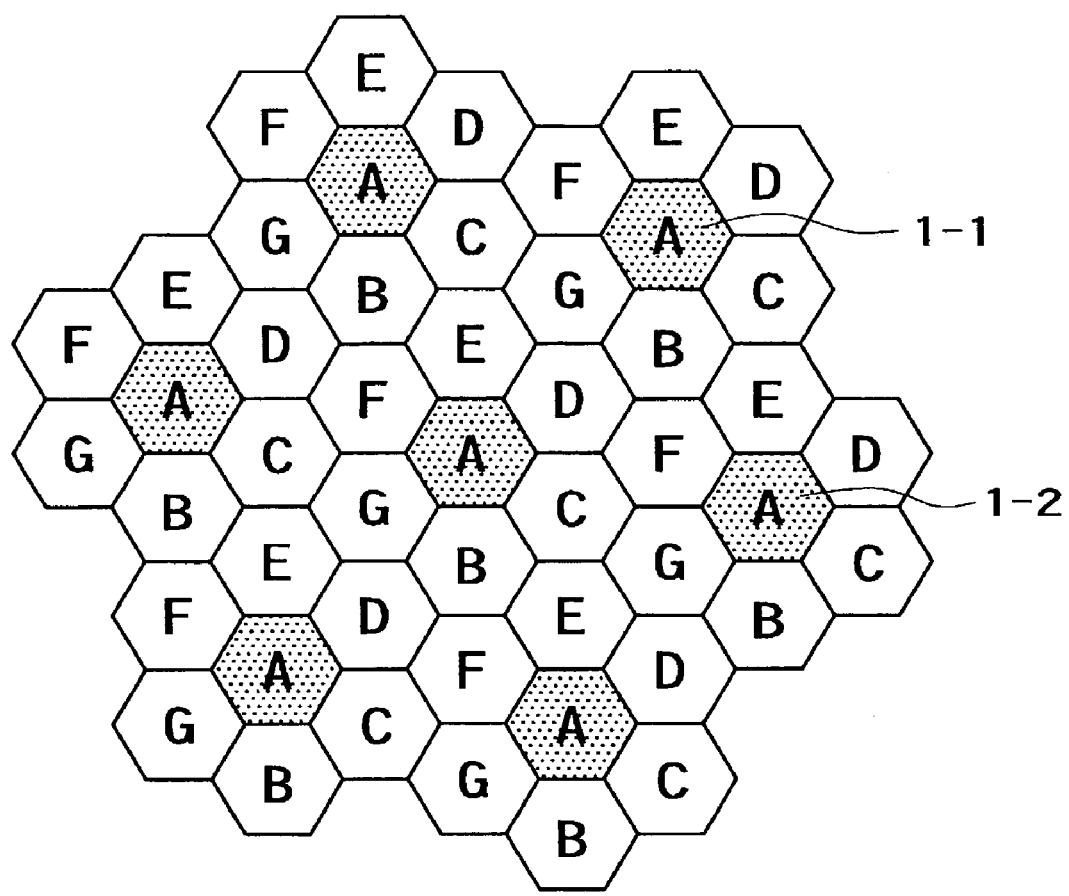

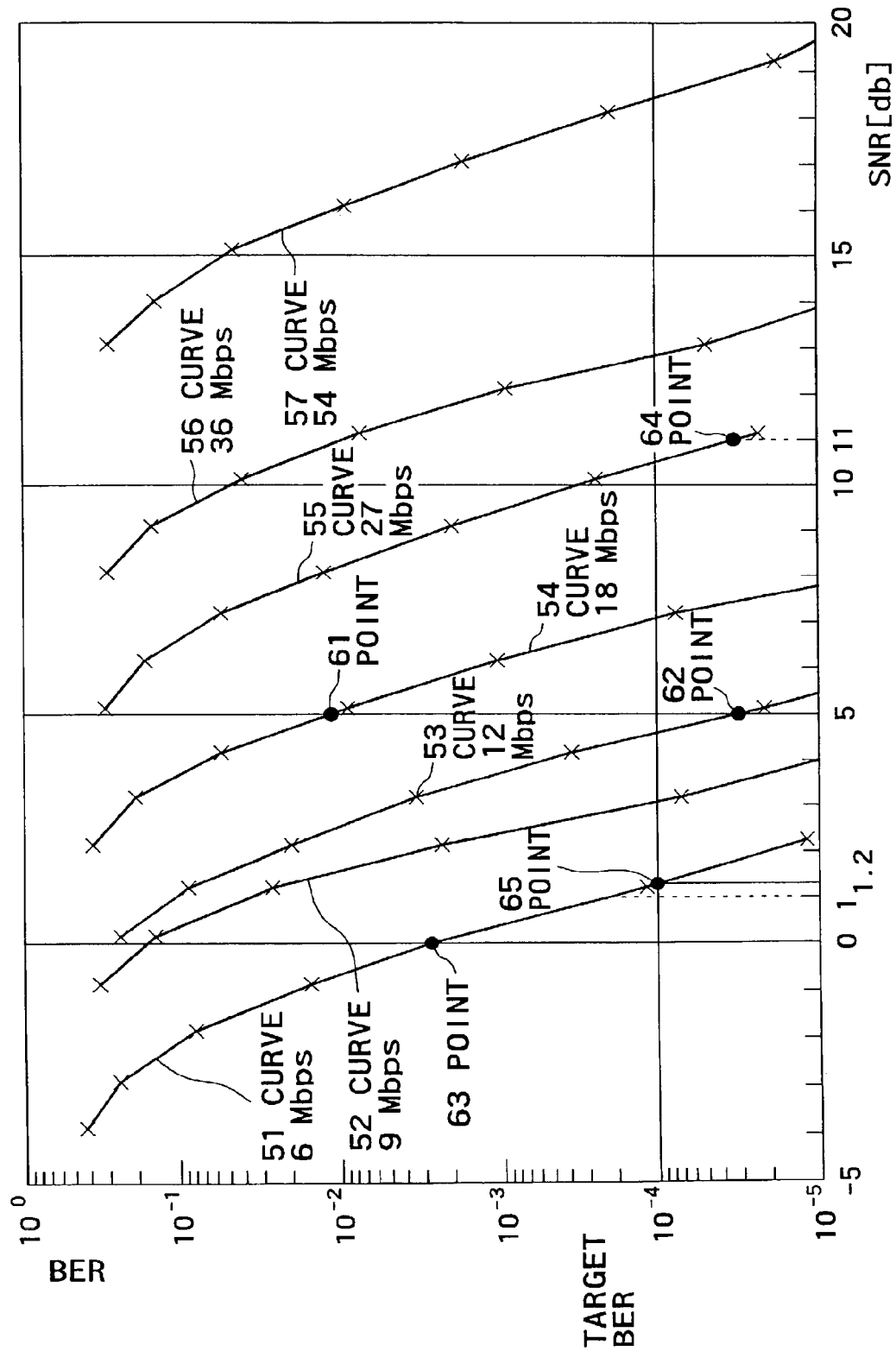
F I G. 5

F I G. 6
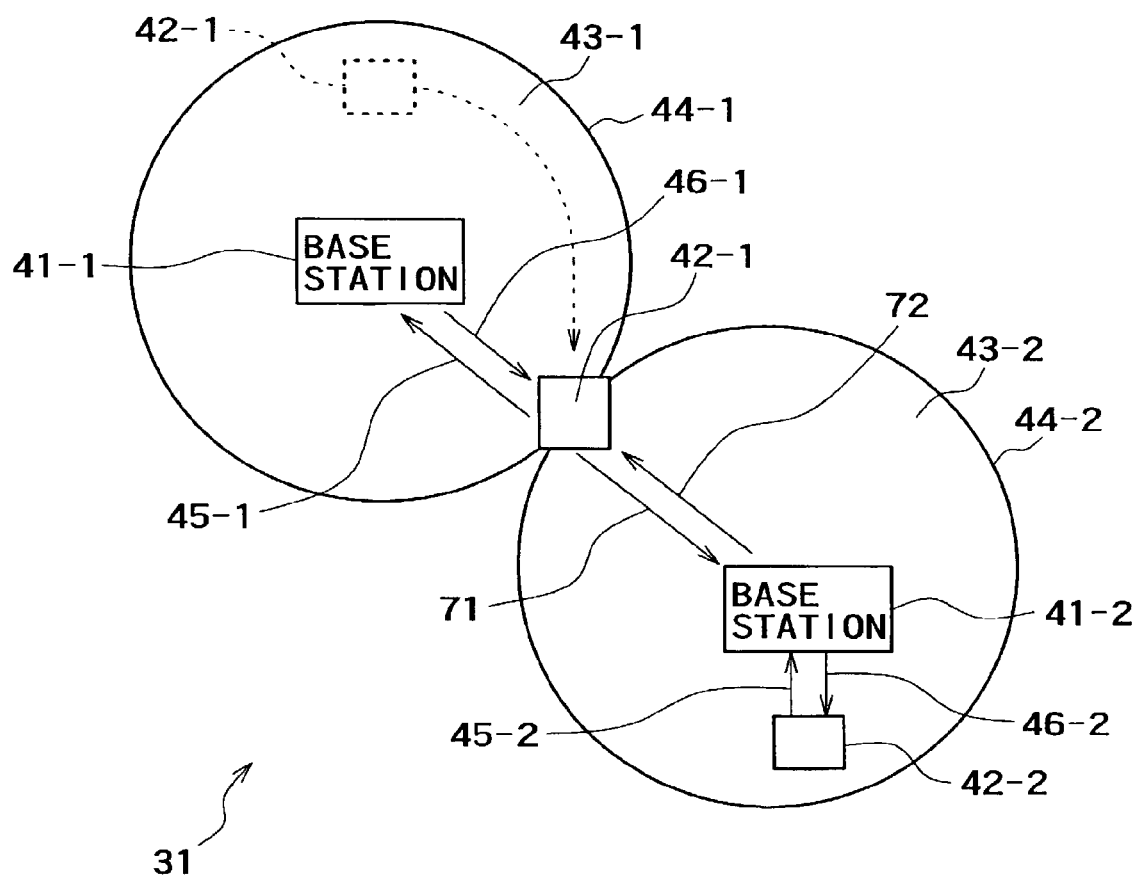

RADIO COMMUNICATION SYSTEM, MOBILE RADIO COMMUNICATION APPARATUS AND METHOD THEREFOR, FIXED RADIO COMMUNICATION APPARATUS AND METHOD THEREFOR, RECORDING MEDIUM, AND PROGRAM

BACKGROUND OF THE INVENTION

1. Field of the Invention

The present invention relates to a radio communication system, mobile radio communication apparatus and a method therefor, fixed radio communication apparatus and a method therefor, recording media, and programs, and more particularly to a radio communication system, mobile radio communication apparatus and a method therefor, fixed radio communication apparatus and a method therefor, recording media, and programs wherein degradation in system performance due to co-channel interference is reduced in environments where negotiation is not conducted between base stations.

2. Description of Related Art

Where a plurality of pieces of fixed radio communication apparatus (hereafter, referred to also as "base stations") are installed and multi-cell operation is performed in a radio communication system in which multiple access is implemented by the TDMA (Time Division Multiple Access) method or the like, if a plurality of pieces of mobile radio communication apparatus (hereafter, referred to also as "mobile stations") connected with different base stations are used on the same frequency channel in the same area, co-channel interference occurs and telephone calls are disabled in the area.

To cope with this, frequency repetition is used in common, wherein areas using the same frequency channel are located far away from one another and channels used are thereby limited.

FIG. 1 illustrates an example of frequency repetition with the frequency divided into seven. As shown in FIG. 1, seven frequency channels A to G allocated to the radio communication system are respectively allocated to seven blocks (hereafter, referred to as "cells") marked with corresponding characters A to G.

As mentioned above, use of frequency repetition locates areas (cells) using the same frequency channel away from one another. However, in this method, the frequency resource allocated to the radio communication system is divided and the number of frequency channels one base station can use is limited to 1/number of divided frequencies, which impairs the efficiency of frequency utilization at the system level. In terms of this, therefore, it is preferable to reduce the number of divided frequencies as much as possible.

However, if frequency repetition with a low value set for the number of divided frequencies is used, the locations of cells using the same frequency channel are physically made closer to one another.

If 3 is taken as the number of divided frequencies, as illustrated in FIG. 2, for example, adjoining base stations (cells) do not use the same frequency channel but the distance between cells using the same frequency channel is shorter than in cases where 7 is taken as the number of divided frequencies (cases illustrated in FIG. 1). For example, the distance between cell 2-1 and cell 2-2 to which the same frequency channel A is allocated is shorter than the distance between cell 1-1 and cell 1-2 to which the same frequency channel A is allocated in FIG. 1.

Further, in fact, an area where the path losses with respect to a plurality of base stations using the same frequency channel are substantially equal is produced.

If a mobile station positioned in proximity to such an area transmits a signal to a base station with which the mobile station is connected, the transmitted signal is an interfering signal for other base stations using the same frequency channel.

For example, it is assumed that mobile stations 12-1 and 12-2 are positioned in an area where the path losses with respect to base stations 11-1 and 11-2 are equal (boundary between the cells (fringe)) and the mobile station 12-1 communicates by air with the base station 11-1 through a communication path (transmission route) 21-1 and the mobile station 12-2 communicates by air with the base station 11-2 through a communication path 21-4, as illustrated in FIG. 3. Further, it is assumed that the same frequency channel is used for the communication paths 21-1 and 21-4.

In this case, the mobile station 12-1 judges that the communication path 21-1 to the base station 11-1 is more suitable as a communication path the mobile station uses than the communication path 21-2 to the base station 11-2 in terms of attenuation and communicates by air with the base station 11-1 through the communication path 21-1. However, in fact, the path losses of both the communication paths 21-1 and 21-2 are substantially equal, and thus, when the mobile station 12-1 transmits a signal to the base station 11-1, the transmitted signal also reaches the base station 11-2 through the communication path 21-2. Since the base station 11-2 is in radio communication with the mobile station 12-2, the signal transmitted from the mobile station 12-1 through the communication path 21-2 is an interfering signal for the base station 11-2.

Similarly, a signal transmitted from the mobile station 12-2 to the base station 11-2 also reaches the base station 11-1 through the communication path 21-3, and thus the signal is an interfering signal for the base station 11-1.

As mentioned above, there is a problem that a signal transmitted from a mobile station to a first base station is an interfering signal for other base stations located in proximity to the mobile station.

Therefore, at the base station 11-1, signals from the mobile station 12-1 are always interfered with by signals from the mobile station 12-2, and at the base station 11-2, signals transmitted from the mobile station 12-2 are always interfered with by signals from the mobile station 12-1. As a result, decoding of the signals becomes unfeasible.

To solve this problem, a technique called soft handoff is used in common. Soft handoff is a technique wherein a mobile station positioned at the fringe of a cell simultaneously communicates by air with two base stations, for example, and the transmission power thereof is controlled according to information indicated by both the base stations, and has been already incorporated in the CDMA (Code Division Multiple Access) cellular system, for example.

However, to implement soft handoff, it is required for each base station to conduct negotiation with other base stations. For example, if base stations are operated by different owners or if base stations are not directly connected with one another through the same network, each of the base stations cannot exchange information required for soft handoff with other base stations and the implementation of soft handoff is difficult.

SUMMARY OF THE INVENTION

The present invention has been made with this situation taken into account, and is intended to reduce degradation in system performance due to co-channel interference in environments where negotiation is not conducted between base stations. To attain the afore-mentioned object, preferred aspects of the present invention are described below.

In the radio communication system of the present invention, when mobile radio communication apparatus detects that the mobile radio communication apparatus is positioned at the fringe of the cell of fixed radio communication apparatus, the mobile radio communication apparatus makes adjustment so as to reduce the transmission power thereof, specifies a required communication condition based on the adjusted transmission power, and transmits signals to the fixed radio communication apparatus on the adjusted transmission power under the specified communication condition.

In the radio communication system of the present invention, when mobile radio communication apparatus detects that the mobile radio communication apparatus is positioned at the fringe of the cell of fixed radio communication apparatus with which the mobile radio communication apparatus is connected, a specified signal is transmitted to the fixed radio communication apparatus on adjusted transmission power under a required communication condition specified based on the adjusted transmission power according to independent judgment by the mobile radio communication apparatus itself.

The mobile radio communication apparatus of the present invention comprises a detecting means which detects that the mobile radio communication apparatus is positioned at the fringe of the cell of fixed radio communication apparatus; an adjusting means which, when it is detected by the detecting means that the mobile radio communication apparatus is positioned at the fringe of the cell of the fixed radio communication apparatus, makes adjustment so as to reduce the transmission power; a specifying means which specifies a required communication condition based on the transmission power adjusted by the adjusting means; and a communicating means which transmits a specified signal to the fixed radio communication apparatus on the transmission power adjusted by the adjusting means under the communication condition specified by the specifying means.

The specifying means is capable of setting the communication condition so as to ensure the specified communication quality at a required level or higher level in the state of the transmission route changed in correspondence with the transmission power adjusted by the adjusting means.

The state of the transmission route may be expressed as either of SNR (Signal-to-Noise Ratio) and SINR (Signal-to-Interference and Noise Ratio) at the fixed radio communication apparatus of a signal which is sent by the communicating means and transmitted to the fixed radio communication apparatus through the transmission route.

The communication quality may be expressed as the bit error rate of a signal which is sent by the communicating means and transmitted to the fixed radio communication apparatus through the transmission route.

The communication condition may be expressed as a bit rate when a signal sent by the communicating means is transmitted to the fixed radio communication apparatus through the transmission route.

The specifying means is capable of specifying the value of a required parameter related to channel coding and thereby specifying a bit rate.

The parameter maybe any of modulation method, coding rate, and spread rate.

The range of values the bit rate can take is preset, and the specifying means can specify as bit rate a required value of those contained in the range. Further, the values within the range consist of a specified number of discrete values and the specifying means can specify one of the discrete values as bit rate.

The mobile radio communication apparatus is further provided with a judging means which judges whether, when a signal is transmitted on the transmission power adjusted by the adjusting means under the communication condition specified by the specifying means, the actual level of communication quality reaches a preset level. If it is judged by the judging means that the level of communication quality does not reach the preset level, the specifying means can further specify a value lower than the value specified immediately before that point of time within the above-mentioned range.

The judging means can judge whether the actual communication quality level of a signal actually transmitted by the communicating means reaches the preset level.

If it is judged by the judging means that the level of communication quality does not reach the preset level and the lowest value within the above-mentioned range has been already specified as bit rate by the specifying means, the adjusting means can make adjustment so as to increase the transmission power.

When a signal transmitted from fixed radio communication apparatus other than the fixed radio communication apparatus with which the mobile radio communication apparatus is presently communicating by air is received by the communicating means, the detecting means can detect that the mobile radio communication apparatus is positioned at the fringe of the cell of the fixed radio communication apparatus.

When a signal transmitted from other mobile radio communication apparatus in radio communication with other fixed radio communication apparatus is received by the communicating means, the detecting means can further detect that the mobile radio communication apparatus is positioned at the fringe of the cell of the fixed radio communication apparatus.

The mobile radio communication apparatus is further provided with a communication line establishing means which, when it is detected by the detecting means that the mobile radio communication apparatus is positioned at the fringe of the cell of the fixed radio communication apparatus, establishes a second communication line to other fixed radio communication apparatus or other mobile radio communication apparatus in addition to the first communication line to the fixed radio communication apparatus. At the same time as radio communication with the fixed radio communication apparatus through the first communication line, the communicating means can start radio communication with other fixed radio communication apparatus or other mobile radio communication apparatus through the second communication line established by the communication line establishing means.

The method for radio communication for mobile radio communication apparatus of the present invention involves a detecting step in which it is detected that mobile radio communication apparatus is positioned at the fringe of the cell of fixed radio communication apparatus; an adjusting step in which, when it is detected through processing in the detecting step that the mobile radio communication apparatus is positioned at the fringe of the cell of the fixed radio communication apparatus, adjustment is made so as to reduce the transmission power; a specifying step in which a required communication condition is specified based on the transmission power adjusted through processing in the adjusting step; and a communicating step in which a specified signal is transmitted to the fixed radio communication apparatus on the transmission power adjusted through processing in the adjusting step under the communication condition specified through processing in the specifying step.

The program in the first recording medium of the present invention involves a detecting step in which it is detected that mobile radio communication apparatus is positioned at the fringe of the cell of fixed radio communication apparatus; an adjusting step in which, when it is detected through processing in the detecting step that the mobile radio communication apparatus is positioned at the fringe of the cell of the fixed radio communication apparatus, adjustment is made so as to reduce the transmission power; a specifying step in which a required communication condition is specified based on the transmission power adjusted through processing in the adjusting step; and a communicating step in which a specified signal is transmitted to the fixed radio communication apparatus on the transmission power adjusted through processing in the adjusting step under the communication condition specified through processing in the specifying step.

The first program of the present invention causes a computer to execute a detecting step in which it is detected that mobile radio communication apparatus is positioned at the fringe of the cell of fixed radio communication apparatus; an adjusting step in which, when it is detected through processing in the detecting step that the mobile radio communication apparatus is positioned at the fringe of the cell of the fixed radio communication apparatus, adjustment is made so as to reduce the transmission power; a specifying step in which a required communication condition is specified based on the transmission power adjusted through processing in the adjusting step; and a communicating step in which a specified signal is transmitted to the fixed radio communication apparatus on the transmission power adjusted through processing in the adjusting step under the communication condition specified through processing in the specifying step.

In the mobile radio communication apparatus and the method therefor, the recording media, and the programs of the present invention, when it is detected that the mobile radio communication apparatus is positioned at the fringe of the cell of fixed radio communication apparatus, a specified signal is transmitted to the fixed radio communication apparatus on the adjusted and reduced transmission power under the communication condition specified based on the adjusted transmission power, according to independent judgment by the mobile radio communication apparatus itself.

The fixed radio communication apparatus of the present invention is provided with a communicating means which, when it is detected by mobile radio communication apparatus that the mobile radio communication apparatus is positioned at the fringe of the cell of the fixed radio communication apparatus and a specified signal is transmitted on the adjusted transmission power under the communication condition specified in correspondence with the adjusted transmission power, receives the signal.

The fixed radio communication apparatus is further provided with a measuring means which measures the level of communication quality, and the communicating means can transmit the level of communication quality measured by the measuring means to mobile radio communication apparatus as an index for re-specification of communication condition or readjustment of transmission power by the mobile radio communication apparatus.

The method for radio communication for fixed radio communication apparatus of the present invention involves a receiving step in which, when it is detected by mobile radio communication apparatus that the mobile radio communication apparatus is positioned at the fringe of the cell of fixed radio communication apparatus and a specified signal is transmitted on the adjusted transmission power under the communication condition specified in correspondence with the adjusted transmission power, the signal is received.

The program of the second recording medium of the present invention involves a receiving step in which, when it is detected by mobile radio communication apparatus that the mobile radio communication apparatus is positioned at the fringe of the cell of fixed radio communication apparatus and a specified signal is transmitted on the adjusted transmission power under the communication condition specified in correspondence with the adjusted transmission power, the signal is received.

The second program of the present invention causes a computer to execute a receiving step in which, when it is detected by mobile radio communication apparatus that the mobile radio communication apparatus is positioned at the fringe of the cell of fixed radio communication apparatus and a specified signal is transmitted on the adjusted transmission power under the communication condition specified in accordance with the adjusted transmission power, the signal is received.

In the fixed radio communication apparatus and the method therefor, the recording media, and the programs of the present invention, when it is detected by mobile radio communication apparatus that the mobile radio communication apparatus is positioned at the fringe of the cell of fixed radio communication apparatus and a specified signal is transmitted on the adjusted transmission power under the communication condition specified in correspondence with the adjusted transmission power according to independent judgment by the mobile radio communication apparatus, the signal is received.

Other and further objects, features and advantages of the invention will appear more fully from the following description.

BRIEF DESCRIPTION OF THE DRAWINGS

FIG. 1 is a drawing illustrating an example of the constitution of frequency repetition wherein 7 is taken as the number of divided frequencies;

FIG. 5 is a drawing illustrating the characteristics of SNR and BER at the receiving end for bit rates;

FIG. 6 is a drawing illustrating an example of the constitution of a radio communication system where cellular phones in connection with base stations in the radio communication system in FIG. 4 are positioned at the fringes of the cells;

DETAILED DESCRIPTION OF THE PREFERRED EMBODIMENTS

Figure 2:
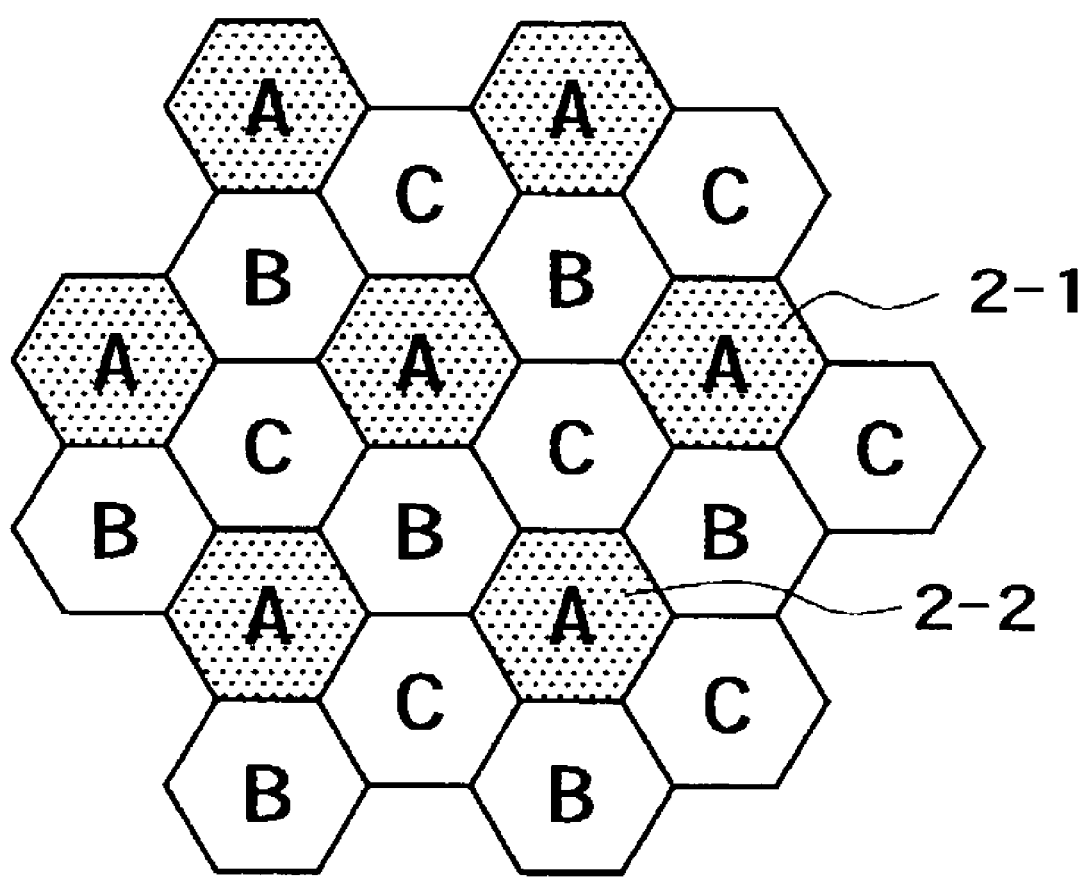
FIG. 2 is a drawing illustrating an example of the constitution of frequency repetition wherein 3 is taken as the number of divided frequencies.
Figure 3:
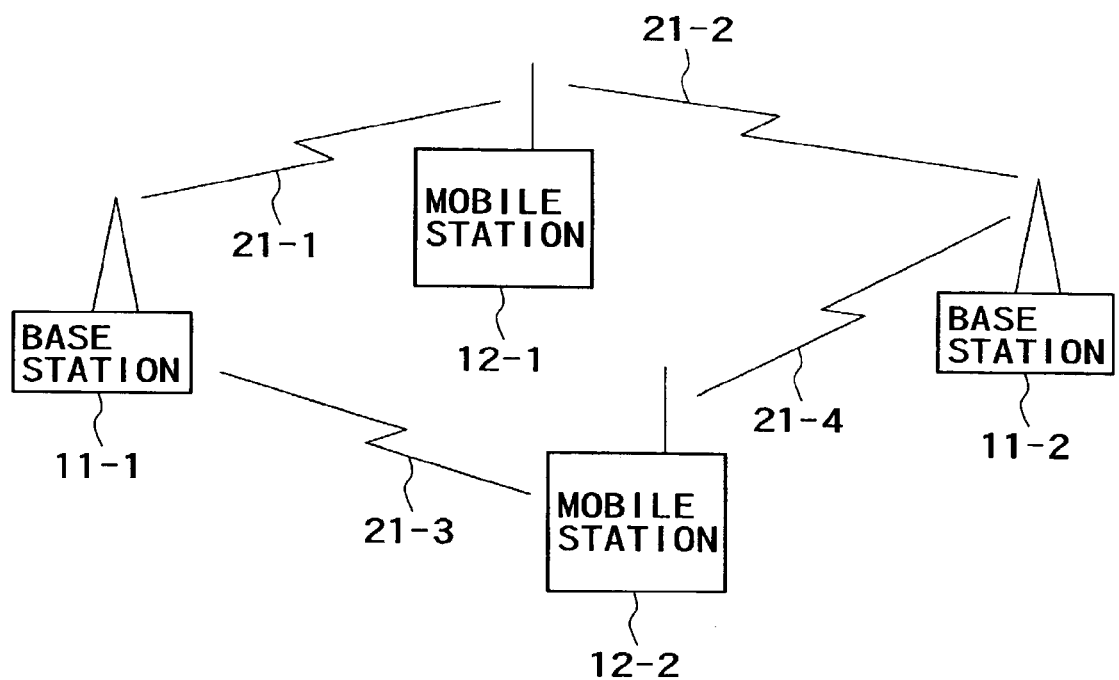
FIG. 3 is a drawing illustrating an example of the constitution of a conventional radio communication system for the purpose of explaining co-channel interference.
Figure 4:
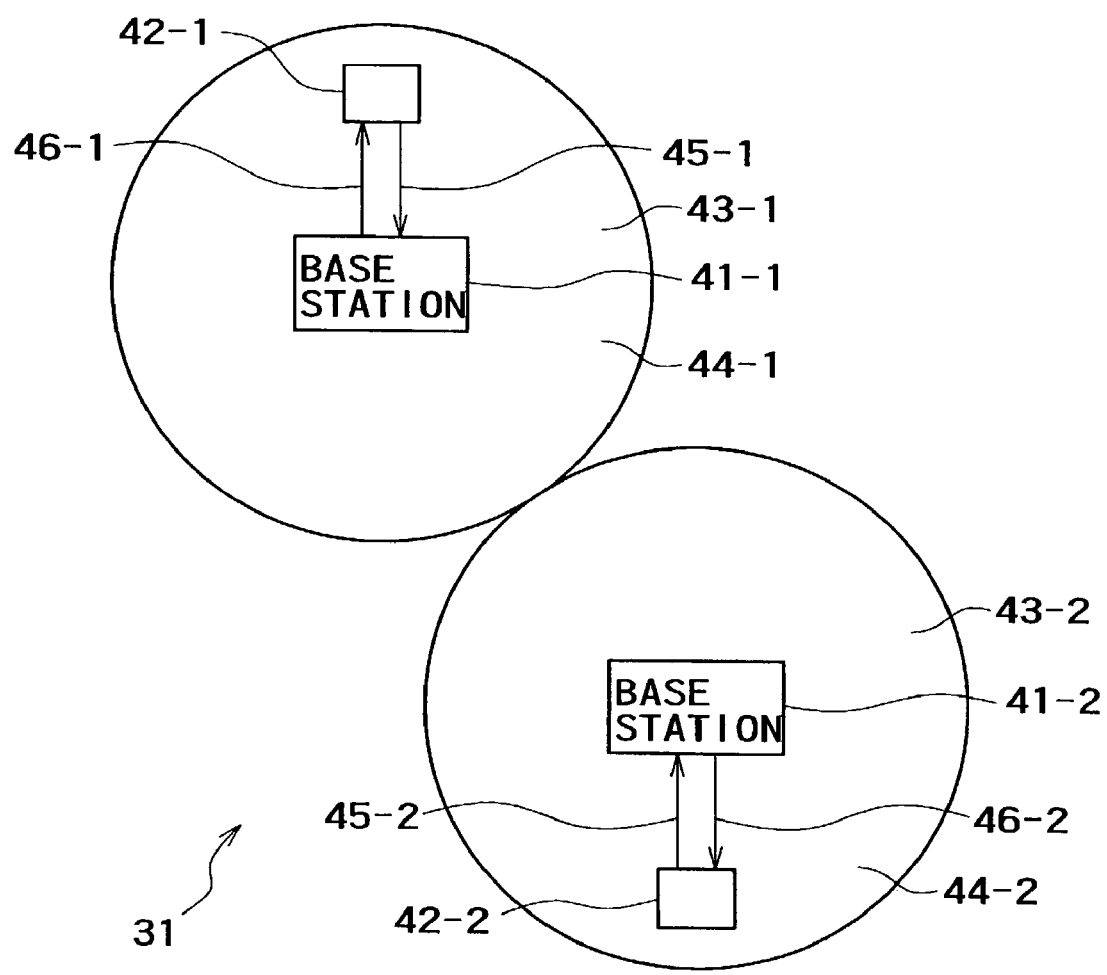
FIG. 4 is a drawing illustrating an example of the constitution of a radio communication system to which the present invention is applied.

FIG. 4 illustrates an example of the constitution of the radio communication system of the present invention.

There is no restriction on the radio communication system 31 provided the system is a radio communication system wherein a plurality of mobile stations and a plurality of base stations are connected in such a manner that multiple access is possible. For example, the radio communication system may be a digital cellular radio communication system or wireless LAN (Local Area Network) which offers data communication services, or a radio communication system which offers multi-cell services based on wireless LAN. In this example, the radio communication system 31 is a system defined by the TDD system in TDMA.

In the radio communication system 31, an arbitrary number of base stations (two stations in this case) 41-1 and 41-2 are installed.

In this example, it is assumed that the base station 41-1 and the base station 41-2 do not negotiate with each other. If the radio communication system is a communication system defined by a wireless LAN (Local Area Network) system of IEEE (The Institute of Electrical Engineers Inc.) 802.11, for example, fixed radio communication apparatus may be designated as access point. Hereafter, the fixed radio communication apparatus, including these pieces of apparatus, will be designated just as base station.

There is no especial restriction on the mobile station provided the mobile station is mobile radio communication apparatus capable of communicating by air both with the base station 41-1 and with the base station 41-2. The mobile station may be PDA (Personal Digital Assistant), a mobile terminal, or the like, and is a cellular phone in this example.

The base station 41-1 communicates by air with the cellular phone 42-1 located in the range where the base station can communicate by air, or the cell 43-1, through an up link 45-1 or a down link 46-1. Similarly, the base station 41-2 communicates by air with the cellular phone 42-2 located in the range where the base station can communicate by air, or the cell 43-2, through an up link 45-2 or a down link 46-2.

More specifically, in this example, it is assumed that channels in the same frequency band are used both in radio communication between the base station 41-1 and the cellular phone 42-1 and in radio communication between the base station 41-2 and the cellular phone 42-2, and the channels in the same frequency band are temporally divided into "periods for which information is transmitted in the up direction" and "periods for which information is transmitted in the down direction" which are established at certain time intervals. That is, it is assumed that channels in the same frequency band are used in the up links 45-1 and 45-2 and in the down links 46-1 and 46-2.

In this case, the cellular phone 42-1 transmits information to the base station 41-1 through the up link 45-1 for the "periods for which information is transmitted in the up direction" and receives information from the base station 41-1 through the down link 46-1 for the "periods for which information is transmitted in the down direction" in a specified cycle (hereafter, referred to as "cycle of TDD").

Similarly, the cellular phone 42-2 transmits information to the base station 41-2 through the up link 45-2 for the "periods for which information is transmitted in the up direction" and receives information from the base station 41-2 through the down link 46-2 for the "periods for which information is transmitted in the down direction" in a cycle of TDD.

In these transmission routes, that is, the up links 45-1 and 45-2 and the down links 46-1 and 46-2, a required communication condition, for example, a bit rate is specified, and information is transmitted at this bit rate.

In practice, the value of a parameter (modulation method, coding rate, spread rate, or the like) for channel coding is specified, and the bit rate is thereby specified. That is, at a bit rate which a specified value of a parameter for channel coding can provide, information is transmitted from the sending end (cellular phone in case of up link or base station in case of down link) to the receiving end (base station in case of up link or cellular phone in case of down link) through the transmission route (up link or down link).

More specifically, for information to be transmitted from a sending end to a receiving end through a transmission route at a high bit rate, a parameter indicating the state of the transmission route, for example, the SNR (Signal-to-Noise Ratio) or SINR (Signal-to-Interference and Noise Ratio) at receiving end of signals from the sending end must be at high level. In other words, the highest bit rate at which information is correctly transmitted through the transmission route depends on SNR or SINR at receiving end.

Therefore, in the radio communication system 31, the highest bit rate at which information is correctly transmitted through the transmission route at the SNR or SINR at receiving end at that point of time, that is, a value for channel coding which can provide the highest bit rate is specified.

More specifically, the value of parameter for channel coding is specified for each transmission route based on the characteristics shown in FIG. 5, and information is transmitted at a bit rate corresponding to the value of the parameter.

In FIG. 5, curve 51 represents the relation between the characteristics of SNR (horizontal axis) and bit error rate (BER (Bit Error Rate)) (vertical axis) when the bit rate is 6 Mbps.

Similarly, curve 52 represents the relation between the characteristics of SNR and BER when the bit rate is 9 Mbps; curve 53 represents that when the bit rate is 12 Mbps; curve 54 represents that when the bit rate is 18 Mbps; curve 55 represents that when the bit rate is 27 Mbps; curve 56 represents that when the bit rate is 36 Mbps; and curve 57 represents that when the bit rate is 54 Mbps.

A specified number of discrete values (seven values, 6, 9, 12, 18, 27, 36, and 57 Mbps, in the example in FIG. 5), including the lowest value (6 Mbps in the example in FIG. 5) are set as bit rate in advance, and in each transmission route (up links 45-1 and 45-2, and down links 46-1 and 46-2), the highest bit rate at which the BER can be reduced to a specified level or lower levels at the level of SNR at the present moment is specified.

In practice, a specified number of discrete values (in the example in FIG. 5, seven values at which 6, 9, 12, 18, 27, 36, or 57 Mbps can be provided), including the lowest value (in the example in FIG. 5, a value at which 6 Mbps can be provided), are set as the values of parameter for channel coding in advance, as mentioned above, and the value of parameter for channel coding is selected from these discrete values and specified in each transmission route.

For the purpose of simplifying the description, specifying a value of channel parameter at which a required bit rate can be provided will be hereafter described just as specifying that bit rate.

For example, it is assumed that 1.0E-4 (E-k (k is an arbitrary integer) represents $10^{-k}$) is required for BER. That is, it is assumed that, if the BER of information received at the receiving end is not more than 1.0E-4, the information is judged to have been correctly communicated (transmitted) by air. Hereafter, thus required BER will be called "target BER."

In this case, for example, if the SNR at receiving end in a transmission route at that point of time is 5 dB, the BER of information transmission at a bit rate of 18 Mbps exceeds the target BER, as shown at point 61. The BER of information transmission at a bit rate of 12 Mbps is lower than the target BER (1.0E-4), as shown at point 62. Therefore, if the SNR at receiving end in the transmission route is 5 dB, 12 Mbps is specified for bit rate.

As mentioned above, the cellular phone 42-1 and the base station 41-1 transmit and receive data to and from each other through the transmission route (up link 45-1 or down link 46-1) at the appropriately selected bit rate, and further the cellular phone 42-2 and the base station 41-2 transmit and receive data to and from each other through the transmission route (up link 45-2 or down link 46-2) at the appropriately selected bit rate.

In the physical relationship illustrated in FIG. 4, the position of the cellular phone 42-1 is sufficiently away from the position of the base station 41-2. Therefore, signals transmitted from the cellular phone 42-1 do not reach the base station 41-2 and are not the above-mentioned interfering signals for the base station 41-2. Similarly, the position of the cellular phone 42-2 is sufficiently away from the position of the base station 41-1. Therefore, signals transmitted from the cellular phone 42-2 do not reach the base station 41-1 and are not the above-mentioned interfering signals for the base station 41-1.

Meanwhile, for example, if the cellular phone 42-1 is moved to a point which is located at the fringe (boundary) 44-1 of the cell 43-1 and in proximity to the fringe 44-2 of the cell 43-2, as shown in FIG. 6, signals sent from the cellular phone 42-1 are transmitted to the base station 41-1 through the up link 45-1 and also transmitted to the base station 41-2 through the link 71.

In other words, the base station 41-2 receives signals from the cellular phone 42-2 through the up link 45-2 and also receives signals from the cellular phone 42-1 through the link 71. Therefore, the signals from the cellular phone 42-1 are interfering signals for the base station 41-2, and the above-mentioned co-channel interference occurs.

For example, if a signal from the cellular phone 42-2, received at the base station 41-2 and an interfering signal from the cellular phone 42-1 are at the identical level in terms of received power and the SNR at the base station 41-2 of the signal from the cellular phone 42-2 is 0 dB, the BER is approx. 3.0E-3, as shown at point 63 in FIG. 5, which exceeds the target BER, even if a bit rate of 6 Mbps excellent in antinoise characteristic is set (even if 6 Mbps, the lowest bit rate, is set). As a result, the base station 41-2 cannot receive information of normal quality.

In the present invention, if the situation is as illustrated in FIG. 6 and the cellular phone 42-1 receives through the link 72 a signal transmitted from the base station 41-2, not from the base station 41-1 with which the cellular phone is supposed to communicate, the cellular phone 42-1 judges (detects) that the cellular phone 42-1 is positioned at the fringe 44-1 of the cell 43-1 and independently reduces the transmission power.

For example, it is assumed that the cellular phone 42-1 reduces the transmission power thereof by a level corresponding to 5 dB of the SNR at the base station 41-2 of the signal from the cellular phone 42-2. In this case, the SNR at the base station 41-2 of the signal from the cellular phone 42-2 is 5 dB, and the transmission power of the cellular phone 42-1 is relatively increased by 5 dB, as compared with the level (0 dB) before the transmission power is adjusted (reduced).

Therefore, though the base station 41-2 cannot use even the lowest bit rate (6 Mbps) as bit rate for the up link 45-2 before the transmission power of the cellular phone 42-1 is adjusted, the base station 41-2 can use a bit rate of 12 Mbps, as shown at point 62 in FIG. 5, after the transmission power of the cellular phone 42-1 is adjusted (reduced).

As mentioned above, at the base station 41-2, the level of co-channel interference due to signals from the cellular phone 42-1 is reduced, and thus the probability of occurrence of disconnection in the line between the base station and the cellular phone 42-2 is reduced. As a result, degradation in the performance of the radio communication system 31 is suppressed.

At this time, the SNR level at the base station 41-1 of the signal from the cellular phone 42-1 is lowered by an equivalent of the transmission power reduced in the cellular phone 42-1. Consequently, the cellular phone 42-1 must re-specify and reduce the bit rate to a value lower than the presently set bit rate based on the adjusted (reduced) transmission power (so that the target BER can be attained at the lowered SNR level at the base station 41-1 of the signal from the cellular phone 42-1). However, the degree of the reduction in bit rate does not pose any problem in terms of practical use, as described below.

In the above-mentioned example, the cellular phone 42-1 is moved to a point which is located at the fringe 44-1 of the cell 43-1 of the base station 41-1 and in proximity to the fringe 44-2 of the cell 43-2. However, if the cellular phone 42-2 is moved to a point which is located at the fringe 44-2 of the cell 43-2 of the base station 41-2 and in proximity to the fringe 44-1 of the cell 43-1, the cellular phone 42-2 can perform the above-mentioned processing like the cellular phone 42-1.

That is, when the cellular phone 42-2 detects that the cellular phone 42-2 is positioned at the fringe 44-2 of the cell 43-2 of the base station 41-2 (when the cellular phone 42-2 receives a signal from the base station 41-1), the cellular phone 42-2 makes adjustment to reduce the transmission power thereof, and further specifies a bit rate at which information can be correctly transmitted on the reduced transmission power based on the present SNR at the base station 41-2 of the signal from the cellular phone 42-2 and transmits information to the base station 41-2 on the adjusted transmission power at the specified bit rate.

Therefore, at the base station 41-1, the level of received power of the interfering signal from the cellular phone 42-2 is lowered, and consequently, the SNR level at the base station 41-1 of the signal from the cellular phone 42-1 is enhanced. As a result, the cellular phone 42-1 and the base station 41-1 can communicate with each other by air at a higher bit rate.

As mentioned above, since the level of co-channel interference due to signals from the cellular phone 42-2 is reduced at the base station 41-1, the probability of occurrence of disconnection in the line between the base station and the cellular phone 42-1 is reduced. As a result, degradation in the performance of the radio communication system 31 is suppressed.

Next, referring to FIG. 7, an example of the constitution of the cellular phone 42-1 and 42-2 will be described. (If there is no necessity to discriminate between cellular phone 42-1 and cellular phone 42-2, they will be hereafter described as cellular phone 42. This is the same with other apparatus.)

Figure 7:
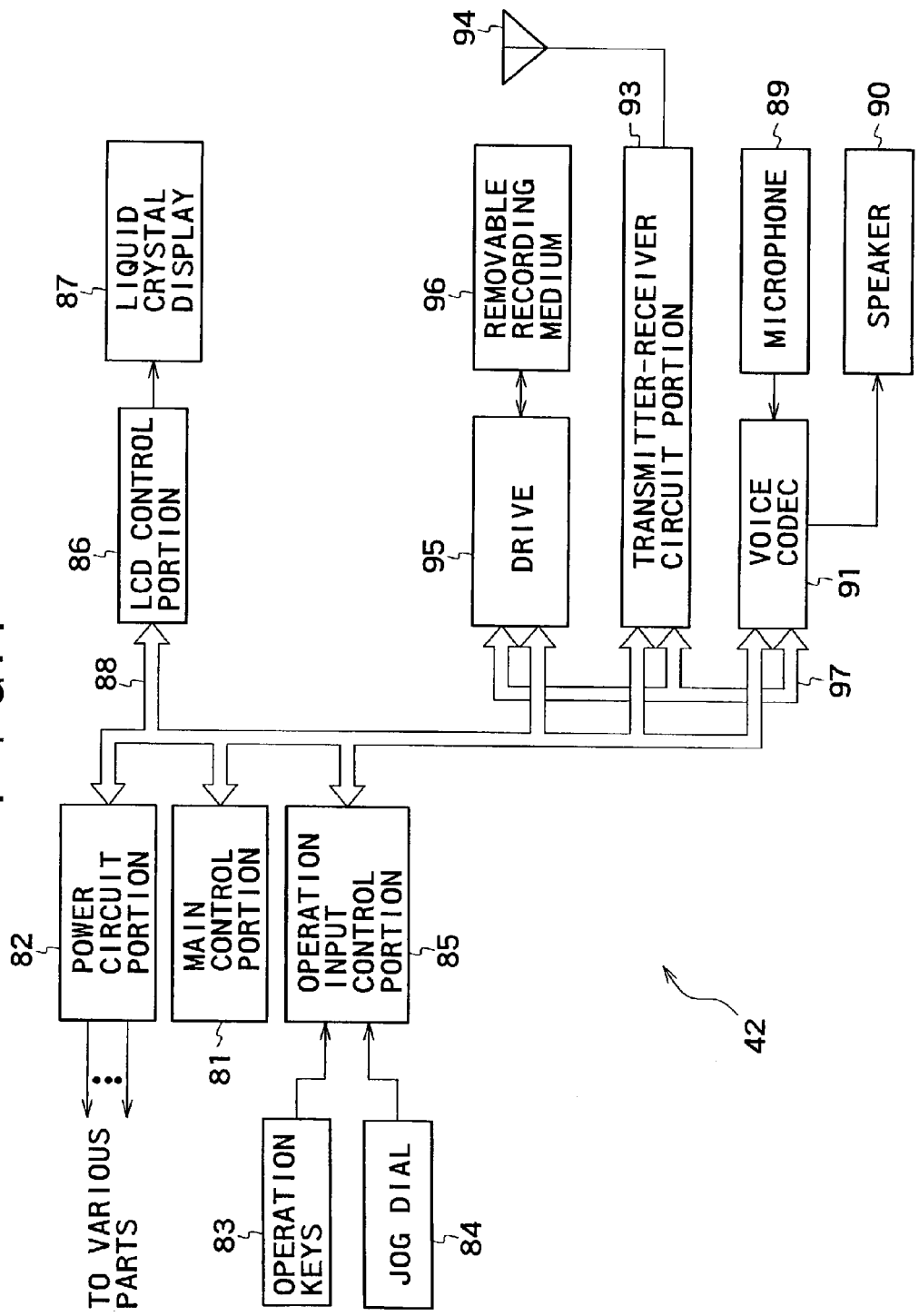
FIG. 7 is a block diagram illustrating an example of the constitution of the cellular phone in the radio communication system in FIG. 4.

As illustrated in FIG. 7, in the cellular phone 42, a main control portion 81 which is so designed as to control each portion in a centralized manner, a power circuit portion 82, an operation input control portion 85, an LCD (Liquid Crystal Display) control portion 86, a drive 95, a transmitter-receiver circuit portion 93, and a voice codec 91 are connected with one another through a main bus 88, and further the drive 95, the transmitter-receiver circuit portion 93, and the voice codec 91 are connected with one another through a synchronous bus 97.

The main control portion 81 consists of CPU (Central Processing Unit), ROM (Read Only Memory), RAM (Random Access Memory) and the like.

In the main control portion 81, the CPU performs various types of processing according to programs stored in the ROM or loaded to the RAM. In the RAM, data required for the CPU to perform various types of processing, and the like are stored as required.

When the ring-off key and power key (not shown) of operation keys 83 is brought into on state through the operation by the user, the power circuit portion 82 supplies power to each part from a battery pack (not shown) to start and enable the cellular phone 42.

Under the control of the main control portion 81, the cellular phone 42 converts aural signals gathered through a microphone 89 in voice communication mode into digital voice data through the voice codec 91, and further converts the data into transmission signals through the transmitter-receiver circuit portion 93 and sends the signals through an antenna 94 on specified transmission power. The details of the transmitter-receiver circuit portion 93 will be described below.

The cellular phone 42 restores reception signals received through the antenna 94 in voice communication mode into the original digital voice data through the transmitter-receiver circuit portion 93, and further converts the data into analog aural signals through the voice codec 91 and then outputs the signals through a speaker 90.

Where, for example, electronic mail is transmitted in data communication mode, the cellular phone 42 sends text data of the electronic mail inputted through the operation of the operation keys 83 or a jog dial 84 out to the main control portion 81 through the operation input control portion 85.

The main control portion 81 causes the LCD control portion 86 to display the text data on a liquid crystal display 87, and further causes the transmitter-receiver circuit portion 93 to convert the text data into transmission signals and transmit the signals to a base station on specified transmission power through the antenna 94.

Where, for example, electronic mail is received in data communication mode, the cellular phone 42 restores reception signals received through the antenna 94 to the original text data through the transmitter-receiver circuit portion 93, and causes the LCD control portion 86 to display the data as received electronic mail on the liquid crystal display 87.

Further, the cellular phone 42 is capable of recording received electronic mail in a removable recording medium 96, including Memory Stick (trademark of Sony Corporation), through the drive 95 according to the operation by the user.

The drive 95 is loaded with a removable recording medium 96 with computer programs stored therein, and the computer programs read therefrom are installed in the main control portion 81 as required.

Next, referring to FIG. 8, an example of the constitution of the transmitter-receiver circuit portion 93 will be described in details.

Figure 8:
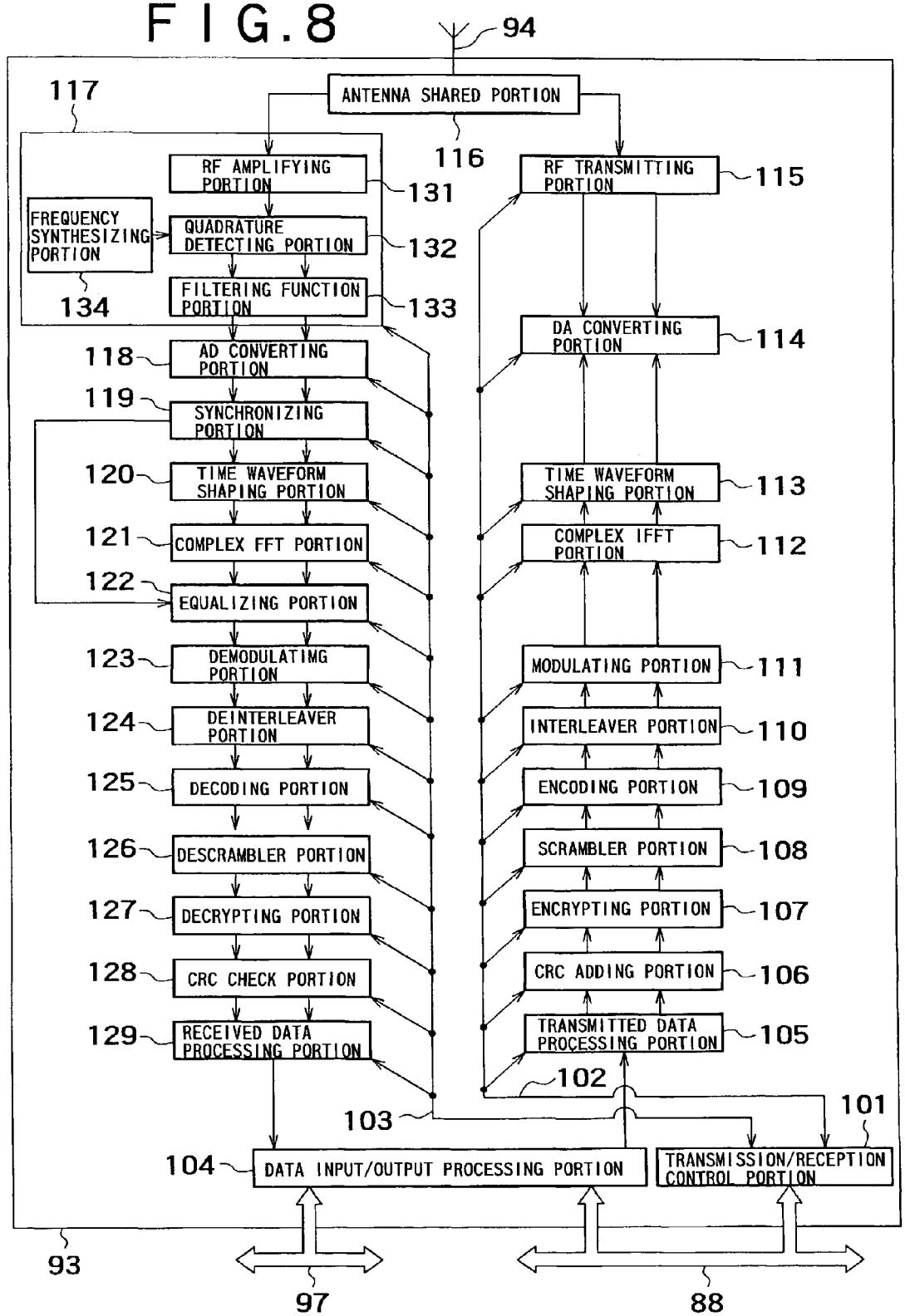
FIG. 8 is a block diagram illustrating an example of the constitution of the transmitter-receiver circuit portion of the cellular phone in FIG. 7.

As illustrated in FIG. 8, the main bus 88 is connected with a transmission/reception control portion 101 which controls the operation of the entire transmitter-receiver circuit portion 93 under the control of the main control portion 81 and a data input/output processing portion 104 which processes the input and output of data under the control of the main control portion 81 as well. The data input/output processing portion 104 is also connected with the synchronous bus 97.

That is, in case of transmission in voice communication mode, the data input/output processing portion 104 converts digital voice data supplied from the voice codec 91 into appropriate digital data rows and supplies the data rows to a transmitted data processing portion 105. In case of reception in voice communication mode, the data input/output processing portion 104 converts data supplied from a received data processing portion 129 into original digital voice data and supplies to the data to the voice codec 91. Similarly, in case of transmission in data communication mode, the data input/output processing portion 104 converts text data and the like supplied from the main control portion 81 into appropriate digital data rows and supplies the data rows to the transmitted data processing portion 105. In case of reception in data communication mode, the data input/output processing portion 104 converts data supplied from the received data processing portion 129 into original text data and supplies the data to the main control portion 81.

The transmission/reception control portion 101 controls each part in a transmission-related block (transmitted data processing portion 105 through RF transmitting portion 115, shown mainly on the right side in FIG. 8) through a transmission-related control line 102, and controls each part in a reception-related block (RF receiving portion 117 through received data processing portion 129, shown mainly on the left side in FIG. 8) through a reception-related control line 103.

That is, the transmission-related control line 102 is connected with the transmitted data processing portion 105 which appropriately multiplexes digital data rows supplied from the data input/output processing portion 104 and communication control data to be transmitted to base stations supplied from the transmission/reception control portion 101, and then forms frame structures and slot structures to be transmitted in radio sections; a CRC (Cyclic Redundancy Check Code) adding portion 106 which adds redundancy to the output of the transmitted data processing portion 105 for error correction on the reception side; an encrypting portion 107 which encrypts the output of the CRC adding portion 106; and a scrambler portion 108 which scrambles the output of the encrypting portion 107 so that the output becomes pseudo-random according to a preset algorithm.

The transmission-related control line 102 is further connected with an encoding portion 109 which subjects the output of the scrambler portion 108 to error-correcting coding; an interleaver portion 110 which interleaves the output of the encoding portion 109, that is, rearranges encoded bit strings according to specific rules, so that burst errors can be converted into random errors by reverse operation on the reception side; a modulating portion 111 which maps the output of the interleaver portion 110 to signal points at the time of transmission and outputs the result of mapping as inphase components (I components) and quadrature components (Q components); a complex IFFT portion 112 which subjects the output of the modulating portion 111 to inverse FFT (First Fourier Transform) and thereby performs OFDM (orthogonal Frequency Division Multiplex) modulation; a time waveform shaping portion 113 which provides the output of the complex IFFT portion 112 with a guard time, for example, by addition of a cycle prefix and performs windowing so that the rising edges and the falling edges of OFDM modulation symbols; and a D-A converting portion 114 which converts the digital signal output of the time waveform shaping portion 113 into analog signals.

The transmission-related control line 102 is further connected with the RF transmitting portion 115 which performs, on the output of the D-A converting portion 114, filtering, vector modulation by I component and Q component, frequency conversion to an appropriate transmission frequency channel, transmission power control, amplification, and the like, and then supplies the output to an antenna shared portion 116 as transmission signal.

Transmission signals inputted to the antenna shared portion 116 are transmitted as radio waves from the antenna 94. These transmission signals are received by base stations. The antenna shared portion 116 is for separating transmission signals and reception signals from each other, and an antenna switch is generally used in TDD taken as an example here.

More specifically, the antenna shared portion 116 separates reception signals (signals transmitted from a base station) received as radio waves by the antenna 94 from transmission signals and outputs the separated signals to the RF receiving portion 117.

Meanwhile, the reception-related control line 103 is connected with the RF receiving portion 117, and the RF receiving portion 117 comprises an RF amplifying portion 131 which amplifies reception signals supplied from the antenna shared portion 116; a quadrature detecting portion 132 which mixes the output of the RF amplifying portion 131 with sine waves generated by a frequency synthesizing portion 134 and separates the mixture into I components and Q components with DC (Direct Current) taken as center frequency; and a filtering function portion 133 which extracts only the band of desired signals from the output of the quadrature detecting portion 132.

The reception-related control line 103 is further connected with an A-D converting portion 118 which converts analog signal output from the filtering function portion 133 into digital signals; a synchronizing portion 119 which subjects the output of the A-D converting portion 118 to frame synchronization, frequency error correction, and the like and, in case other parties available for communication is searched immediately after the application of power or on any other like occasion and in other like cases, performs synchronizing signal detection or initial synchronization; a time waveform shaping portion 120 which provides the output of the synchronizing portion 119 with such time waveform shaping that a guard time, for example, by addition of a cycle prefix is removed; a complex FFT portion 121 which subjects the output of the time waveform shaping portion 120 to FFT and thereby performs OFDM demodulation; an equalizing portion 122 which estimates a transmission route and equalizes the output of the complex FFT portion 121 based on the result of the estimation and is, in some cases, fed with information from the synchronizing portion 119 as input and uses the information for transmission route estimation and the like; and a demodulating portion 123 which subjects the output of the equalizing portion 122 to signal point judgment and generates estimated received bit values.

The reception-related control line 103 is further connected with a deinterleaver portion 124 which deinterleaves the output of the demodulating portion 123, that is, rearranges encoded bit strings outputted from the demodulating portion 123 according to specific rules; a decoding portion 125 which subjects the output of the deinterleaver portion 124 to decoding of the error-correcting code generated on the transmission side; a descrambler portion 126 which subjects the output of the decoding portion 125 to descrambling, or the inverse transformation of scrambling performed by the scrambler portion 108 on the transmission side; a decrypting portion 127 which decrypts encryption implemented by the encrypting portion 107 on the transmission side; a CRC check portion 128 which outputs the data obtained by removing the CRC from the output of the decrypting portion 127 and the result of CRC check on that received block; and the received data processing portion 129 which, if it judged from the supplied result of CRC check on the received block that there is no error, further removes the frame structures and slot structures, given for transmission in radio sections, from the supplied received data with the CRC removed, and outputs the data to the data input/output processing portion 104.

If received data contains communication control data from a base station, the received data processing portion 129 takes out that portion and supplies it to the transmission/reception control portion 101 through the reception-related control line 103. The transmission/reception control portion 101 interprets the supplied control data under the control of the main control portion 81 and exercises control according to the instruction of the control data.

For example, if the ARQ (Automatic Request For Repetition) system is employed, the received data processing portion 129 operates as follows:

Where the output from the CRC check portion 128 contains information containing no error in received blocks, the received data processing portion 129 supplies the received blocks to the received data processing portion 129 and further supplies the information containing no error in the received blocks to the transmission/reception control portion 101 through the reception-related control line 103, as mentioned above. When the transmission/reception control portion 101 acquires the information, the transmission/reception control portion, under the control of the main control portion 81, instructs through the transmission-related control line 102 the transmitted data processing portion 105 to transmit an ACK (Acknowledgement) signal to the base station. The transmitted data processing portion 105 multiplexes the transmission ACK signal together with the transmitted data or performs other like processing and supplies the data to the CRC adding portion 106. The transmission ACK signal supplied to the CRC adding portion 106 is transmitted to the base station through the encrypting portion 107 through the RF transmitting portion 115 in the transmission-related block, the antenna shared portion 116, and the antenna 94, mentioned above.

Where the output from the CRC check portion 128 contains information containing any error in received blocks, the above-mentioned received blocks are not supplied to the received data processing portion 129, and the information containing the error in the received blocks is supplied to the transmission/reception control portion 101 through the reception-related control line 103. When the transmission/reception control portion 101 acquires the information, the transmission/reception control portion, under the control of the main control portion 81, instructs through the transmission-related control line 102 the transmitted data processing portion 105 to transmits a NAK (Negative Acknowledgement) signal to the base station. The transmitted data processing portion 105 multiplexes the transmission NAK signal together with the transmitted data or performs other like processing and thereby supplies the transmission NAK signal to the CRC adding portion 106. The transmission NAK signal supplied to the CRC adding portion 106 is transmitted to the base station through the encrypting portion 107 through the RF transmitting portion 115 in the transmission-related block, the antenna shared portion 116, and the antenna 94, mentioned above. When the base station receives the NAK signal, the base station resends blocks for which the NAK signal has been transmitted.

For example, if stream communication, such as voice communication, wherein retransmission, such as ARQ, is not used is carried out, the received data processing portion 129 operates as follows:

If the output from the CRC check portion 128 contains information containing no error in received blocks, the received blocks are supplied to the received data processing portion 129, as mentioned above.

Meanwhile, if the output from the CRC check portion 128 contains information containing an error in any received block, the received data processing portion 129 discards the received block, handles the block as an erasure, and complements the erasure using the precedent received block or performs other like processing.

As mentioned above, each of the transmitted data processing portion 105 through the RF transmitting portion 115 in the transmission-related block is connected with the transmission/reception control portion 101 through the transmission-related control line 102, and the transmission/reception control portion 101 controls the turn-on and -off of each of the transmitted data processing portion 105 through the RF transmitting portion 115 in the transmission-related block, controls the operation of, and monitors the state of, the RF transmitting portion 115, and controls and monitors the various operations in the transmission-related block, including fine adjustment of transmission timing, changing of coding methods and signal point mapping methods, and the above-mentioned retransmission control, through the transmission-related control line 102.

Meanwhile, each of the the RF receiving portion 117 through the received data processing portion 129 in the reception-related block is connected with the transmission/reception control portion 101 through the reception-related control line 103, and the transmission/reception control portion 101 controls the turn-on and -off of each of the RF receiving portion 117 through the received data processing portion 129 in the reception-related block, controls the operation of, and monitors the state of, the RF receiving portion 117, and controls and monitors the various operations in the reception-related block, including fine adjustment of reception timing, changing of decoding methods and signal point mapping methods, and the above-mentioned retransmission control, through the reception-related control line 103.

In this description, the transmission/reception control portion 101 exercises control on the above-mentioned transmission/reception-related blocks under the control of the main control portion 81. However, the transmission/reception-related blocks may be controlled directly by the main control portion 81.

As mentioned above, the cellular phone 42 carries out not only the functions as a telephone but also the transmission/reception of mail and other functions. Further, the cellular phone 42 is provided with blocks required for transmitting/receiving image data as required, so that the cellular phone is also capable of transmitting/receiving image data. However, the constitution of these blocks or transmission/reception processing for image data is not directly concerned with the present invention and such constitution and processing is easy for persons skilled in the art to understand. Therefore, the description of the constitution and the processing will be omitted.

Next, referring to FIG. 9, an example of the constitution of the fixed radio communication apparatus (base station) 41 will be described. There is no restriction on the fixed radio communication apparatus 41 provided the apparatus has a function of radio communication with cellular phones 42.

CPU 201 performs various types of processing according to programs stored in ROM 202 or loaded from a storage portion 208 to RAM 203.

In the RAM 203, data required for the CPU 201 to perform various types of processing, and the like are stored as required.

The CPU 201, the ROM 202, and the RAM 203 are connected with one another through a bus 204. The bus 204 is also connected with an input/output interface 205.

The input/output interface 205 is connected with an input portion 206 comprising a keyboard and the like, an output portion 207 comprising a display and the like, the storage portion 208 constituted of a hard disk and the like, and a communicating portion 209 for performing communication processing for radio communication with cellular phones 42.

The input/output interface 205 is further connected with a drive 210 as required. A removable recording medium 211, such as magnetic disk, optical disk, magnetic optical disk, and semiconductor memory, is loaded to the drive as required, and computer programs read therefrom are installed in the storage portion 208 as required.

Figure 10:
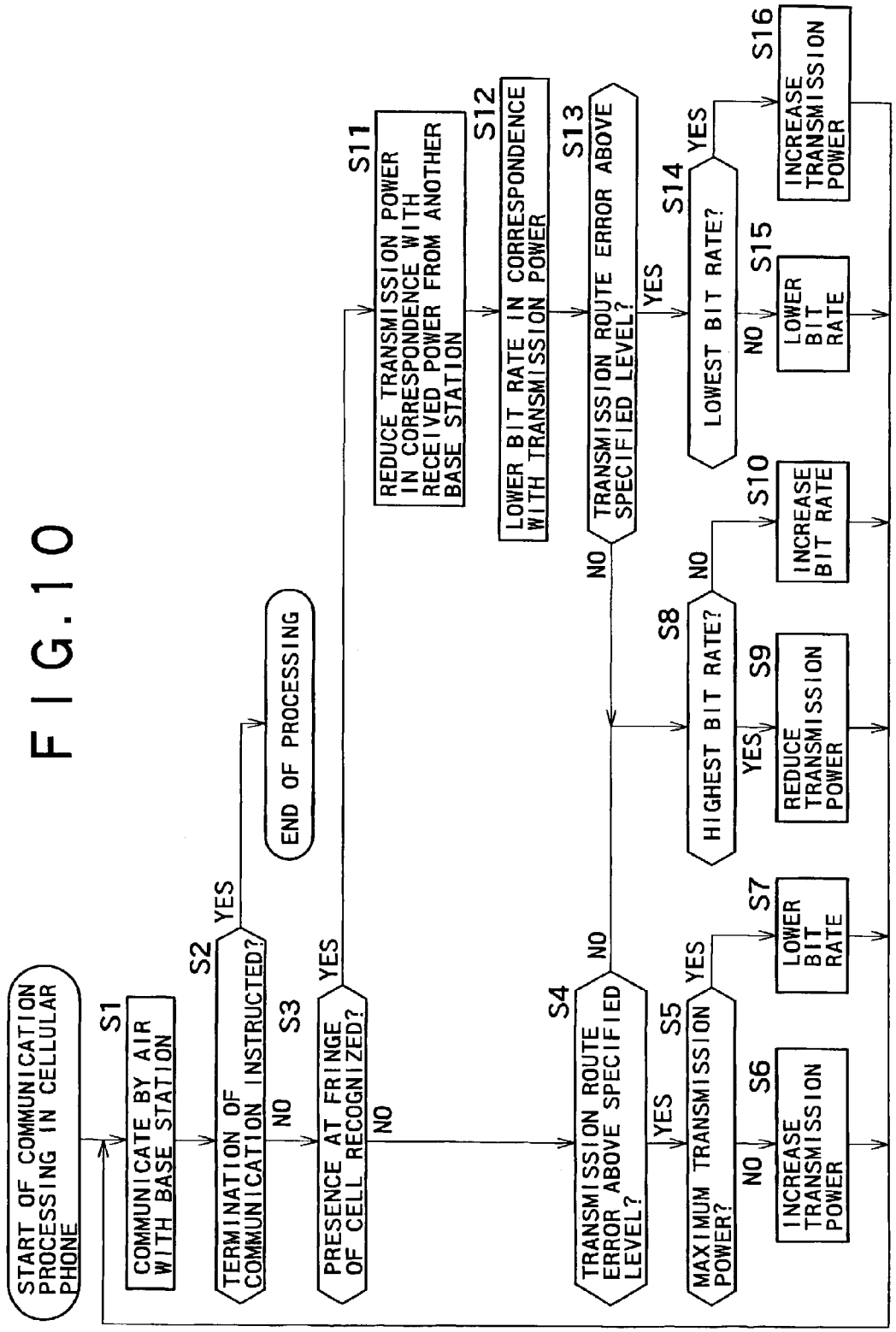
FIG. 10 is a flowchart describing communication processing in the cellular phone in FIG. 7.

Next, referring to FIG. 10, communication processing in the cellular phone 42-1 will be described.

It is assumed that the radio communication system is in the state illustrated in FIG. 4, that is, the cellular phone 42-1 and the base station 41-1 are connected with each other and further the cellular phone 42-2 and the base station 41-2 are connected with each other.

At Step S1, the main control portion 81 of the cellular phone 42-1 in FIG. 7 communicates by air with the base station 41-1 through the bus 88, the transmitter-receiver circuit portion 93, and the antenna 94, and through the up link 45-1 or the down link 46-1 in FIG. 4.

At Step S2, the main control portion 81 judges whether the termination of communication has been instructed by the user through the operation keys 83, and, when the main control portion 81 judges that the termination of communication has been instructed, terminates the processing.

If the main control portion 81 judges at Step S2 that the termination of communication has not been instructed, the main control portion 81 judges at Step S3 whether it has been detected that the cellular phone 42-1 is positioned at the fringe 44-1 of the cell 43-1 (in proximity to the fringe 44-2 of the cell 43-2).

More specifically, the main control portion 81 keeps monitoring the received power (and further detects the attributes of signals, if required). If the monitored received power is lower than a specified reference level in a period of time for which the signals from the base station 41-1 are not received, the main control portion 81 recognizes that base stations other than the base station 41-1 do not exist and judges at Step S3 that it has not been detected that the cellular phone is positioned at the fringe 44-1 of the cell 43-1 (detects that the cellular phone is not positioned at the fringe 44-1 of the cell 43-1).

In this case, at Step S4, the main control portion 81 judges whether the transmission route error (BER) is above a specified level (target BER) in communication with the base station 41-1.

In this example, it is assumed that the transmission route error is supplied from the base station 41-1. That is, when the base station 41-1 receives a signal transmitted from the cellular phone 42-1, the base station 41-1 measures BER for the received signal, and informs the cellular phone 42-1 of the BER level thereof.

If the main control portion 81 judges at Step S4 that the transmission route error is above the specified level, the main control portion 81 judges at Step S5 whether the present transmission power is the maximum transmission power. If the present transmission power is the maximum transmission power, the main control portion 81 performs at Step S7 processing to lower the bit rate. If the present transmission power is not the maximum transmission power, the main control portion 81 performs at Step S6 processing to increase the transmission power. Thereafter, the operation goes back to Step S1 and the step and the following steps are repeated to sustain the radio communication with the base station 41-1.

There is no especial restriction on the method for changing the bit rate at Step S7 or that at Step S10 and Step S15, described blow. In this example, a specified number of discrete values are stored in advance in the ROM in the main control portion 81 or the like, and the main control portion 81 specifies as the bit rate used from now one of these discrete values. More specifically, the values of 6, 9, 12, 18, 27, and 54 (Mbps) as shown in FIG. 5 are stored, and one is selected from among these values. (In fact, the discrete values of parameter for channel coding which can provide these bit rates are stored, and any of these discrete values is set.)

If the main control portion 81 judges at Step S4 that the transmission route error is not above the specified level, the main control portion 81 judges at Step S8 whether the present bit rate is the maximum bit rate. If the main control portion 81 judges that the present bit rate is the maximum bit rate, the main control portion 81 performs at Step S9 processing to reduce the transmission power. If the main control portion 81 judges that the present bit rate is not the maximum bit rate, the main control portion 81 performs at Step S10 processing to increase the bit rate. Thereafter, the operation goes back to Step S1 and the step and the following steps are repeated to sustain the radio communication with the base station 41-1.

If the cellular phone 42-1 is moved to a point at the fringe 44-1 of the cell 43-1 (in proximity to the fringe 44-2 of the cell 43-2), as illustrated in FIG. 6, signals transmitted from the base station 41-2 (for example, data and the like to the cellular phone 42-2) also reach the cellular phone 42-1 though the link 72.

When the main control portion 81 receives a signal, transmitted from the base station 41-2 through the link 72, through the antenna 94, the transmitter-receiver circuit portion 93, and the bus 88 at this time, the main control portion 81 detects (judges to have detected) at Step S3 that the cellular phone is positioned at the fringe 44-1 of the cell 43-1 (in proximity to the fringe 44-2 of the cell 43-2) and makes the processing proceed to Step S11.

The criterion of judgment at Step S3 of whether the cellular phone 42-1 is positioned at the fringe 44-1 of the cell 43-1 (in proximity to the fringe 44-2 of the cell 43-2) is not limited to the above-mentioned criterion, that is, whether a signal from another base station 41-2 is received by the cellular phone 42-1. For example, if a signal from the cellular phone 42-2 connected with another base station 41-2 is received by the cellular phone 42-1, also, it may be judged that the cellular phone 42-1 is positioned at the fringe 44-1 of the cell 43-1 (in proximity to the fringe 44-2 of the cell 43-2).

At Step S11, the main control portion 81 measures the received power of the signal from the base station 41-2, received through processing at Step S3, and performs processing to reduce the transmission power according to the measured received power.

As mentioned above, the SNR level at the base station 41-1 of a signal from the cellular phone 42-1 is lowered by an equivalent of the reduced transmission power of the cellular phone 42-1. Accordingly, the main control portion 81 performs at Step S12 processing to lower the bit rate in correspondence with the transmission power adjusted (reduced) through processing at Step S11 (so that the target BER can be attained at the lowered SNR level at the base station 41-1 of the signal from the cellular phone 42-1.)

Then, the main control portion 81 transmits specified data through the bus 88, the transmitter-receiver circuit portion 93, and the antenna 94 on the transmission power adjusted (reduced) through processing at Step S11 at the bit rate specified through processing at Step S12.

The data sent through the antenna 94 is transmitted to the base station 41-1 through the up link 45-1. When the base station 41-1 receives the transmitted data, the base station 41-1 measures the BER of the data and sends the BER to the cellular phone 42-1 (Step S42 in FIG. 11). The sent BER is transmitted to the cellular phone 42-1 through the down link 46-1. Or, when the base station 41-1 receives the transmitted data, the base station 41-1 makes error judgment on the data and sends to the cellular phone 42-1 information indicating whether an error has occurred (ACK or NAK). The ACK or NAK is transmitted to the cellular phone 42-1 through the down link 46-1. In this case, the cellular phone 42-1 calculates the BER based on the transmitted ACK or NAK.

When the main control portion 81 receives the transmitted data through the antenna 94, the transmitter-receiver circuit portion 93, and the bus 88 at this time, the main control portion 81 judges at Step S13 whether the received BER (transmission route error) is above the specified level (target BER). If the main control portion 81 judges that the transmission route error is not above the specified level, the main control portion 81 goes to Step S8 and repeats the step and the following steps.

If the main control portion 81 judges at Step S13 that the transmission route error is above the specified level, the main control portion 81 judges at Step S14 whether the bit rate specified through processing at Step S12 is the lowest bit rate (6 Mbps in this example).

If the main control portion 81 judges at Step S14 that the specified bit rate is not the lowest bit rate, the main control portion 81 performs at Step S15 processing to further lower the bit rate. Then, the main control portion 81 goes back to Step S1 and sends the specified data through the bus 88, the transmitter-receiver circuit portion 93, and the antenna 94 on the transmission power adjusted (reduced) through processing at Step S11 at the bit rate re-specified through processing at Step S15.

If the main control portion 81 judges at Step S14 that the bit rate specified through processing at Step S12 is the lowest bit rate, the main control portion 81 performs at Step S16 processing to increase the transmission power so that the target BER can be attained at the lowest bit rate because the bit rate cannot be further lowered. Then, the main control portion 81 goes back to Step S1 and sends the specified data through the bus 88, the transmitter-receiver circuit portion 93, and the antenna 94 on the transmission power readjusted (increased) through processing at Step S16 at the bit rate specified through processing at Step S12.

For example, it is assumed that the target BER is 1.0E-4, a bit rate of 18 Mbps is specified, and the SNR at the base station 42-1 of a signal from the cellular phone 42-1 is 5 dB, the BER exceeds the target BER, as shown at point 61 in FIG. 5.

In this case, the main control portion 81 further lowers the bit rate (Step S15). For example, when the bit rate is lowered to 12 Mbps, the BER falls below the target BER, as shown at point 62, and normal data transmission becomes feasible.

Meanwhile, it is assumed that the target BER is identically 1.0E-4, the lowest bit rate of 6 Mbps is specified, and the SNR at the base station 42-1 of a signal from the cellular phone 42-1 is 0 dB, the BER exceeds the target BER, as shown at point 63, but the bit rate cannot be further lowered because the lowest bit rate has been already used.

In this case, the main control portion 81 makes adjustment to increase the transmission power to such a level that the target bit rate can be attained at the lowest bit rate (such a level that the SNR at the base station 42-1 of the signal from the cellular phone 42-1 is not less than 1.2 dB, as shown at point 65) (Step S16).

Above is the description of communication processing in the cellular phone 42-1. However, the same processing as described above is carried out in the cellular phone 42-2 as well.

As mentioned above, in the radio communication system 31 of the present invention, the cellular phone 42, when the cellular phone detects that the cellular phone is positioned at the fringe of the cell of the base station 41 with which the cellular phone is connected, reduces the transmission power thereof before transmitting data. Therefore, the level of occurrence of co-channel interference due to transmission signals from the cellular phone 42 is reduced at other base stations (base stations with which the cellular phone is not connected). As a result, the probability of occurrence of line disconnection due to co-channel interference is reduced, and thus degradation in system performance is suppressed. This effect is remarkable especially where negotiation is not conducted between base stations and further co-channel interference occurs.

When the main control portion 81 of the cellular phone 42-1 detects that the cellular phone is positioned at the fringe of the cell of the base station 41-1, the main control portion 81 can establish a second communication line to another base station 41-2 or another cellular phone 42-2, in addition to the first communication line to the base station 41-1. The cellular phone 42-1 is capable of communicating by air with the base station 41-1 through the first communication line and simultaneously beginning to communicate by air another base station 42-2 or another cellular phone 42-2 through the newly established second communication line. This is the same with the cellular phone 42-2.

Thus, the cellular phone 42 is capable of independently adjusting the transmission power according to the above-mentioned judgment by itself and thereby reducing the interference the cellular phone causes without conventional transmission power adjustment by soft handoff.

Figure 11:
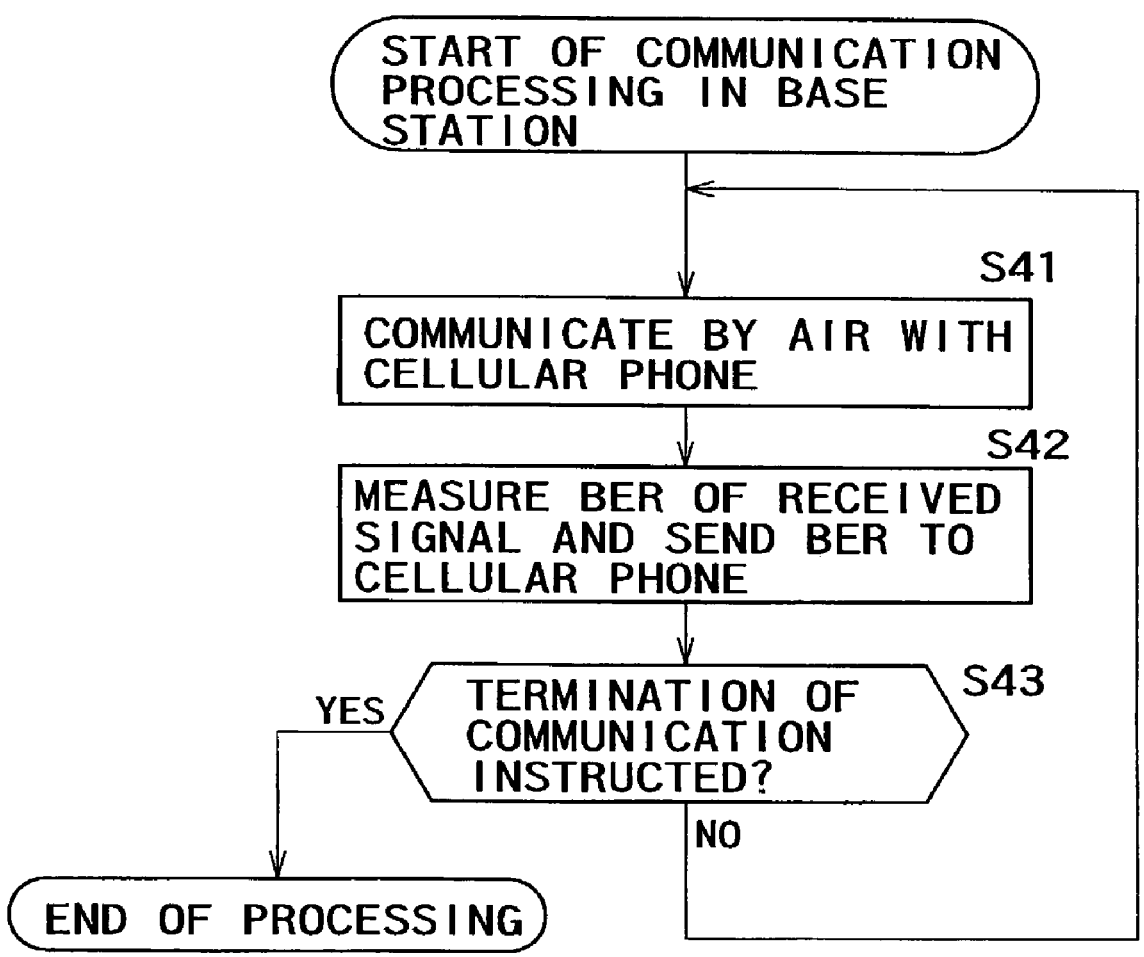
FIG. 11 is a flowchart describing communication processing in the fixed radio communication apparatus (base station) in FIG. 9.

Processing in the base station 41 in response to the above-mentioned communication processing in the cellular phone 42 is as illustrated in FIG. 11.

Figure 9:
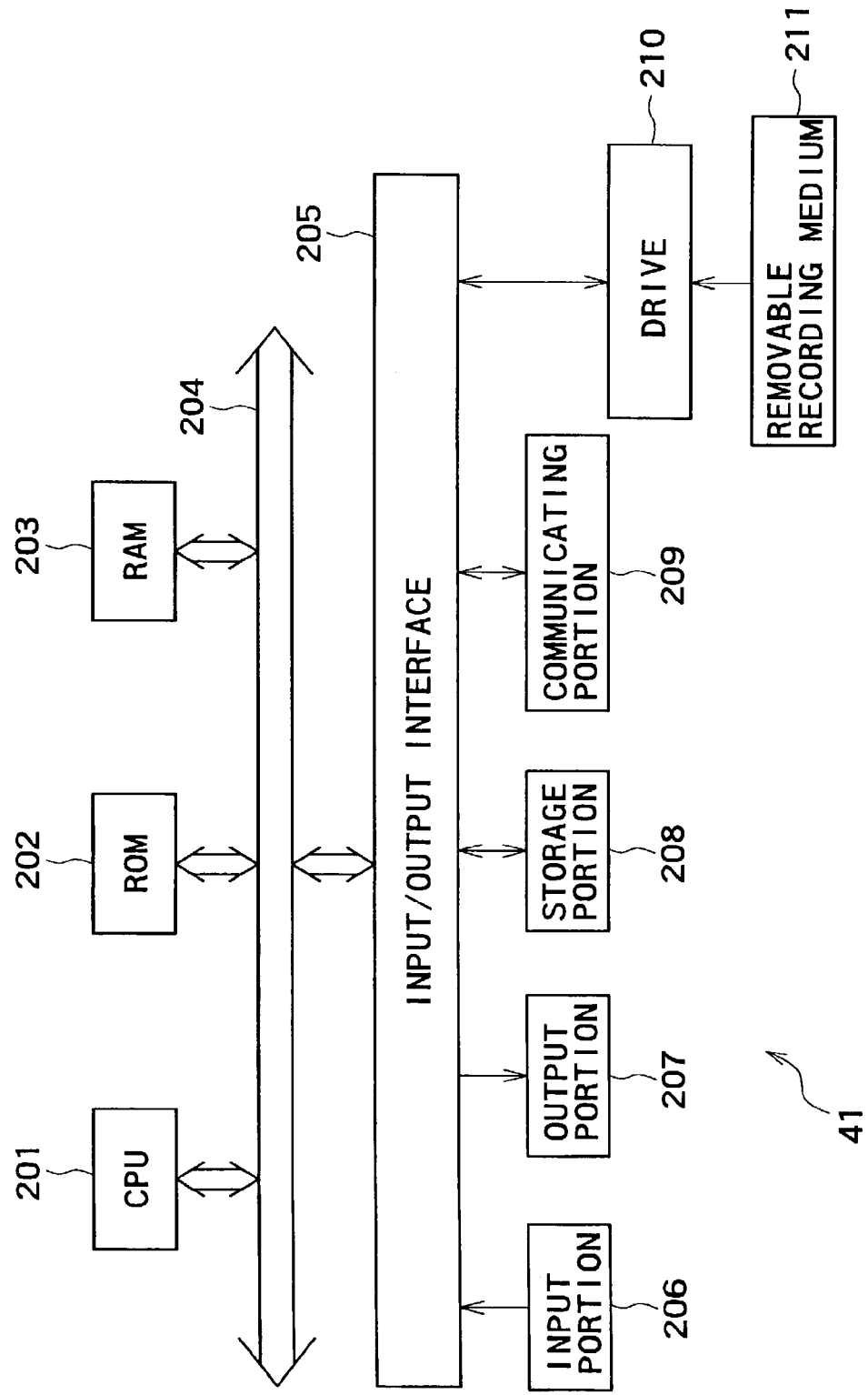
FIG. 9 is a block diagram illustrating an example of the constitution of fixed radio communication apparatus used as the base station in the radio communication system in FIG. 4.

The CPU 201 of the base station 41 in FIG. 9 communicates by air at Step S41 with the cellular phone 42 positioned in the cell 43 thereof through the up link 45 or the down link 46.

For example, the cellular phone 42 detects (judges to have detected) through the above-mentioned processing at Step S3 that the cellular phone 42 is positioned at the fringe of the cell of the base station 41 with which the cellular phone 42 is connected, and makes adjustment to reduce the transmission power through processing at Step S11 and to lower the bit rate in accordance with the adjusted transmission power through processing at Step S12.

Thus, the cellular phone 42 sends specified data on the reduced transmission power at the lowered bit rate. The sent data is transmitted to the base station 41 through the up link 45.

In this case, when the CPU 201 of the base station 41 receives the transmitted data through the communicating portion 209, the input/output interface 205, and the bus 204, the CPU 201 measures the BER of the data and transmits the result of the measurement to the cellular phone 42 at Step S42. Or, the CPU 201 makes error judgment on the data and transmits information indicating whether an error has occurred (ACK or NAK) to the cellular phone 42 at Step S42.

That is, the base station 41 sends the measured BER through the bus 204, the input/output interface 205, and the communicating portion 209 as an index for the cellular phone 42 to perform the above-mentioned processing at Step S13 (processing to judges whether the transmission power or the bit rate should be readjusted).

The BER sent from the base station 41 (communicating portion 209) is transmitted to the cellular phone 42 through the down link 46, and the cellular phone 42 performs the above-mentioned processing at Step S13 using this BER.

Thereafter, the base station 41 judges at Step S43 whether the termination of communication has been instructed. If the base station 41 judges that the termination of communication has been instructed, the base station 41 terminates the processing. If the base station 41 judges that the termination of communication has not been instructed, the base station 41 returns the processing to Step S41 and repeats the step and the following steps. That is, the base station 41 continues to communicate by air with the cellular phone 42.

In case a series of the processes mentioned above is performed by software, the programs comprising the software are installed in a computer built in dedicated hardware, a general-purpose cellular phone or a personal computer which is capable of performing a variety of functions by installing corresponding programs, or the like through a network or a recording medium.

In case the apparatus is a cellular phone, the recording medium is constituted not only of a removable recording medium 96, such as a package medium comprising the above-mentioned Memory Stick as semiconductor memory or the like, with the programs stored therein, distributed to users and the like for providing the programs separately from the cellular phone, as illustrated in FIG. 7, but also of the ROM in the main control portion 8 with the programs stored therein which is supplied to users as is built in the body of the apparatus in advance, or the like.

In case the apparatus is a personal computer or the like used as a base station, the recording medium is constituted not only of are movable recording medium 211, such as a package medium comprising a magnetic disk (including floppy disk), an optical disk (including CD-ROM and DVD), a magnetic optical disk (including MD), semiconductor memory, or the lie, with the programs stored therein, distributed to the administrators thereof for providing the programs separately from the personal computer, as illustrated in FIG. 9, but also of ROM 202, a hard disk built in the storage portion 208, or the like with the programs stored therein which is supplied to users as is built in the body of the apparatus in advance.

In the present specification, the steps describing the programs stored in a recording medium include of course processes which are done in chronological order one by one. However, the steps also include processes which are done in parallel or individually, not in chronological order.

In the present specification, "system" refers to an entire set of devices consisting of processing means and a plurality of pieces of apparatus.

As mentioned above, the present invention allows radio communication to be carried out with reliability. The present invention further allows the reduction of degradation in system performance due to co-channel interference.

The foregoing invention has been described in terms of preferred embodiments. However, those skilled, in the art will recognize that many variations of such embodiments exist. Such variations are intended to be within the scope of the present invention and the appended claims.

What is claimed is:

1. A radio communication system wherein fixed radio communication apparatus and mobile radio communication apparatus employ a method of communicating by air with each other, comprising:
   adjusting, a transmission power of said mobile radio communication apparatus independently, by the mobile radio communication apparatus upon detecting that said mobile radio communication apparatus is positioned at the fringe of a cell of said fixed radio communication apparatus by reception of a transmission of a further radio communication apparatus of a further cell, a current transmission power of the mobile radio communication apparatus being adjusted in correspondence to the magnitude of the reception of the transmission of the further radio communication apparatus of the further cell,
   specifying a required communication condition based on said transmission power adjusted, and
   transmitting a specified signal to said fixed radio communication apparatus of the cell on said transmission power adjusted in accordance with said communication condition.

2. A mobile radio communication apparatus which communicates by air with fixed radio communication apparatus, comprising:
   a detecting means for detecting that said mobile radio communication apparatus is positioned at the fringe of a cell of said fixed radio communication apparatus;
   an adjusting means for adjusting independently, by the mobile radio communication apparatus upon detecting that said mobile radio communication apparatus is positioned at said fringe of said cell of said fixed radio communication apparatus, a reduction in the transmission power by reception of a transmission of a further radio communication apparatus of a further cell, a current transmission power of the mobile radio communication apparatus being adjusted in correspondence to the magnitude of the reception of the transmission of the further radio communication apparatus of the further cell;
   a specifying means for specifying a required communication condition based on said adjusted transmission power; and
   a communicating means for communicating a specified signal to said fixed radio communication apparatus of the cell on said adjusted transmission power in accordance with said communication condition.

3. The mobile radio communication apparatus according to claim 2, wherein said specifying means specifies said communication condition so as to ensure specified communication quality at a required level or higher level in the state of the transmission route changed in correspondence with said adjusted transmission power.

4. The mobile radio communication apparatus according to claim 3, wherein the state of said transmission route is expressed as either of the SNR and SINR at said fixed radio communication apparatus of said signal sent by said communicating means and transmitted to said fixed radio communication apparatus through said transmission route.

5. The mobile radio communication apparatus according to claim 3, wherein said communication quality is the bit error rate of said signal sent by said communicating means and transmitted to said fixed radio communication apparatus through said transmission route.

6. The mobile radio communication apparatus according to claim 3, wherein said communication condition is the bit rate when said signal sent by said communicating means is transmitted to said fixed radio communication apparatus through said transmission route.

7. The mobile radio communication apparatus according to claim 6, wherein said specifying means specifies the value of a required parameter related to channel coding and thereby specifies said bit rate.

8. The mobile radio communication apparatus according to claim 7, wherein said parameter is any of modulation method, coding rate, and spread rate.

9. The mobile radio communication apparatus according to claim 6, wherein the range of values said bit rate can take is preset, and said specifying means specifies as said bit rate a required one of the values contained in said range.

10. The mobile radio communication apparatus according to claim 9, wherein the values in said range consist of a specified number of discrete values, and said specifying means specifies as said bit rate one of said discrete values.

11. The mobile radio communication apparatus according to claim 9, further comprising:
    a judging means for judging when said signal is transmitted on said transmission power adjusted by said adjusting means under said communication condition specified by said specifying means, judges whether the actual level of said communication quality reaches a preset level, and wherein said specifying means, when it is judged by said judging means that the level of said communication quality does not reach the preset level, specifies as said bit rate a value lower than the value specified immediately before that point of time within said range.

12. The mobile radio communication apparatus according to claim 11, wherein said judging means judges whether the level of said communication quality of a signal actually communicated by said communicating means reaches a preset level.

13. The mobile radio communication apparatus according to claim 11, wherein said adjusting means, when it is judged by said judging means that the level of said communication quality does not reach said preset level and the lowest value within said range has been already specified as said bit rate by said specifying means, makes adjustment to increase said transmission power.

14. The mobile radio communication apparatus according to claim 2, wherein said detecting means, when a signal sent by said fixed radio communication apparatus other than said fixed radio communication apparatus with which said mobile radio communication apparatus communicates by air is received by said communicating means, detects that said mobile radio communication apparatus is positioned at said fringe of said cell of said fixed radio communication apparatus.

15. The mobile radio communication apparatus according to claim 14, wherein said detecting means, when a signal sent by other mobile radio communication apparatus in radio communication with said other fixed radio communication apparatus is received by said communicating means, further detects that said mobile radio communication apparatus is positioned at said fringe of said cell of said fixed radio communication apparatus.

16. The mobile radio communication apparatus according to claim 14, further comprising:

a communication line establishing means for establishing when it is detected by said detecting means that said mobile radio communication apparatus is positioned at said fringe of said cell of said fixed radio communication apparatus, a second communication line to said other fixed radio communication apparatus or said other mobile radio communication apparatus, in addition to the first communication line to said fixed radio communication apparatus, and wherein said communicating means communicates by air with said fixed radio communication apparatus through said first communication line and simultaneously begins to communicate by air with said other fixed radio communication apparatus or said other mobile radio communication apparatus through said established second communication line.

17. A method for radio communication for mobile radio communication apparatus which communicates by air with fixed radio communication apparatus, the method comprising:

detecting that said mobile radio communication apparatus is positioned at the fringe of a cell of said fixed radio communication apparatus;

adjusting independently, by the mobile radio communication apparatus upon detecting that said mobile radio communication apparatus is positioned at the fringe of the cell of said fixed radio communication apparatus, the transmission power by reception of a transmission of a further radio communication apparatus of a further cell, a current transmission power of the mobile radio communication apparatus being adjusted in correspondence to the magnitude of the reception of the transmission of the further radio communication apparatus of the further cell;

specifying a required communication condition based on said adjusted transmission power; and communicating a specified signal to said fixed radio communication apparatus of the cell using said adjusted transmission power with said specified communication condition.

18. A recording medium with a computer-readable program recorded therein, the computer program being for controlling mobile radio communication apparatus which communicates by air with fixed radio communication apparatus and comprising:

detecting that said mobile radio communication apparatus is positioned at the fringe of a cell of said fixed radio communication apparatus;

adjusting independently, by the mobile radio communication apparatus upon detecting that said mobile radio communication apparatus is positioned at the fringe of the cell of said fixed radio communication apparatus, the transmission power by reception of a transmission of a further radio communication apparatus of a further cell, a current transmission power of the mobile radio communication apparatus being adjusted in correspondence to the magnitude of the reception of the transmission of the further radio communication apparatus of the further cell;

specifying a required communication condition based on said adjusted transmission power; and communicating a specified signal to said fixed radio communication apparatus of the cell using said adjusted transmission power with said specified communication condition.

19. A fixed radio communication apparatus which communicates by air with mobile radio communication apparatus, the fixed radio communication apparatus comprising:

a communicating means which, when it is detected by said mobile radio communication apparatus that said mobile radio communication apparatus is positioned at the fringe of a cell of said fixed radio communication apparatus a specified signal is transmitted to the fixed radio communication apparatus of the cell on adjusted transmission power, an adjustment of the transmission power being based upon a reception of a transmission of a further radio communication apparatus of a further cell, a previous transmission power of the radio communication apparatus being adjusted in correspondence to the magnitude of the reception of the transmission of the further radio communication apparatus of the further cell to define the adjusted transmission power, the adjusted transmission power having a communication condition specified in accordance with the adjusted transmission power, receives said signal; and a measuring means for measuring the level of communication quality, and wherein said communicating means sends the level of said communication quality measured by said measuring means to said mobile radio communication apparatus through said transmission route as an index for the re-specification of said communication condition or the readjustment of said transmission power by said mobile radio communication apparatus.

20. A method of performing radio communication with a fixed radio communication apparatus wirelessly linked to a mobile radio communication apparatus, the method comprising:

detecting the presence of the mobile radio communication apparatus at a fringe of a cell including the fixed radio communication apparatus;

transmitting a specified signal to the fixed radio communication apparatus of the cell at an adjusted transmission power, an adjustment of the transmission power being based upon a reception of a transmission of a further radio communication apparatus of a further cell, a previous transmission power being adjusted in correspondence to the magnitude of the reception of the transmission of the further radio communication apparatus of the further cell to define the adjusted transmission power, the adjusted transmission power having a communication condition specified in accordance with the adjusted transmission power;

receiving the specified signal at the fixed radio communication apparatus;

measuring the level of the communication quality of the specified signal;

providing the communication quality level of the received specified signal to the mobile radio communication apparatus as an index for the re-specification of the communication condition or the readjustment of the transmission power by the mobile radio communication apparatus.

\* \* \* \* \*